(12) United States Patent
Goettl

(10) Patent No.: US 6,828,035 B1
(45) Date of Patent: Dec. 7, 2004

(54) WALL PEDESTAL FOR DISPLAYING ANIMAL HEADS AND OTHER WILDLIFE OBJECTS

(76) Inventor: Bob Goettl, 19044 E. Eastman Ave., Aurora, CO (US) 80013

( * ) Notice: Subject to any disclaimer, the term of this patent is extended or adjusted under 35 U.S.C. 154(b) by 0 days.

(21) Appl. No.: 10/611,117

(22) Filed: Jul. 1, 2003

(51) Int. Cl.$^7$ .......................... A47G 29/00; G09B 25/00
(52) U.S. Cl. ...................... 428/542.4; 428/16; 428/99; 428/913.3; 434/296; 248/289.11; 248/309.1; 248/222.52; 211/70; 211/103; 40/411; 40/492; 40/531
(58) Field of Search .................. 428/16, 99, 542.4, 428/913.3; 434/296; 248/274.1, 276.1, 282.1, 283.1, 278.1, 222.52, 289.11, 694, 309.1; 211/89.01, 95, 97, 98, 101, 102, 103, 90.02, 1, 70; 40/411, 492, 530, 531

(56) References Cited

U.S. PATENT DOCUMENTS

| | | | | |
|---|---|---|---|---|
| 85,815 | A | * | 1/1869 | Hafemalz ................. 248/278.1 |
| 453,008 | A | * | 5/1891 | Kaempfer .................... 248/314 |
| 894,116 | A | * | 7/1908 | Choate .................. 248/289.11 |
| 2,003,896 | A | * | 6/1935 | Menger ....................... 434/296 |
| 2,382,231 | A | * | 8/1945 | Katz et al. .................... 428/16 |
| 2,939,364 | A | * | 6/1960 | Doswell et al. ............. 248/478 |
| 3,929,228 | A | * | 12/1975 | Margolin et al. ........... 211/102 |
| 4,074,884 | A | * | 2/1978 | Antoszewski .......... 248/289.11 |
| 4,225,106 | A | * | 9/1980 | Eplan ....................... 248/282.1 |
| 4,464,440 | A | * | 8/1984 | Dotzman .................. 428/542.4 |
| 4,717,626 | A | * | 1/1988 | Badger ..................... 428/542.4 |
| 4,903,370 | A | * | 2/1990 | Erdmann ..................... 16/87.2 |
| 4,971,865 | A | * | 11/1990 | Nowlan ................... 428/542.4 |
| 5,015,532 | A | * | 5/1991 | Knight |
| 5,472,765 | A | * | 12/1995 | Green |
| 5,779,294 | A | * | 7/1998 | Magri |
| 6,364,261 | B1 | * | 4/2002 | Vass, Jr. |

\* cited by examiner

*Primary Examiner*—Jennifer McNeil
(74) *Attorney, Agent, or Firm*—Edwin H. Crabtree; Ramon L. Pizarro; Donald W. Margolis

(57) ABSTRACT

A wall pedestal for displaying and rotating an animal head and other wildlife objects next to a wall. The wall pedestal includes a wall mounting plate adapted for securing the pedestal to the wall at various heights. The wall mounting plate includes an outwardly extending horizontal support arm. A far end of the horizontal support arm includes a threaded bore for receiving a threaded lower end of a vertical pivot rod. An upper end of the vertical pivot rod is slidably received in a lower portion of a vertical sleeve. A top portion of the vertical sleeve is attached to a portion of a display mounting plate. The display mounting plate is adapted for attachment to the wildlife object suspended the object thereon.

17 Claims, 2 Drawing Sheets

US 6,828,035 B1

WALL PEDESTAL FOR DISPLAYING ANIMAL HEADS AND OTHER WILDLIFE OBJECTS

BACKGROUND OF THE INVENTION (a) Field of the Invention

This invention relates to the displaying of trophy animal heads and more particularly, but not by way of limitation, to a rotatable wall pedestal for displaying an animal head and other wildlife next to a wall.

(b) Discussion of Prior Art

Heretofore, there have been a niumber of different types of wall mountings used for displaying trophy animal heads, animal horns and the like. In U.S. Pat. No. 453,008 to Kaempfer, a plate or escutcheon is disclosed and used for suspending animal horns from a wall. A shield is provided for covering a skull portion between the horns. In U.S. Pat. Nos. 2,003,896 to Menger and 3,319,922 to Christensen, two different types of trophy or horn mounts are illustrated for attaching to a wall. The mounts include a shield for covering the skull of the animal. In U.S. Pat. No. 4,464, 440 to Dotzman, a trophy mount is described having a simulated skull structure for mounting and displaying horns, antlers and the like. In U.S. Pat. No. 5,472,765 to Green, a shed antler mounting kit is disclosed. The kit includes a model skull replica and means for attaching antlers to the skull replica. In U.S. Pat. No. 3,301,728 to Swartz, a process of making three dimensional display items is described. The process can be used for making an animal trophy mount.

None of the above mentioned prior art patents specifically disclose the unique features, structure and function of the subject wall pedestal for displaying animal heads and various types of wildlife and like objects.

SUMMARY OF THE INVENTION

In view of the foregoing, it is a primary objective of the subject invention to provide a wall pedestal for displaying various types of animal heads and other types of wildlife.

Another object of the invention is to allow an animal head or wildlife object mounted on the wall pedestal to rotate to various positions next to the wall for enhanced viewing.

Still another object of the wall pedestal is to provide an outdoor appearance with the pedestal covered with weathered imitation wood or imitation rock next to the displayed item.

Yet another object of the invention is the pedestal is easy to assemble and mount on a wall. The pedestal can easily be adapted for holding different sizes, shapes and weights of wildlife objects next to the wall.

Still another object of the invention is the wall pedestal can be used for displaying trophy animal heads, small stuffed animals, large birds and other wildlife objects.

The subject wall pedestal for displaying a wildlife object next to a wall and rotating the object thereon includes a wall mounting plate adapted for securing to the wall at various heights. The wall mounting plate includes an outwardly extending horizontal support arm. A far end of the support arm includes a threaded bore for receiving a threaded lower end of a vertical pivot rod. An upper end of the vertical pivot rod is slidably received in a vertical sleeve. A top portion of the sleeve is attached to a portion of a display mounting plate. The display mounting plate is adapted for attachment to the wildlife object suspended thereon.

These and other objects of the present invention will become apparent to those familiar with the mounting and displaying of animal heads and other outdoor objects next to the side of a wall when reviewing the following detailed description, showing novel construction, combination, and elements as herein described, and more particularly defined by the claims, it being understood that changes in the various embodiments of invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the principles thereof, and in which.

DETAILED DESCRIPTION OF THE PREFERRED EMBODIMENTS

Figures 1, 2:
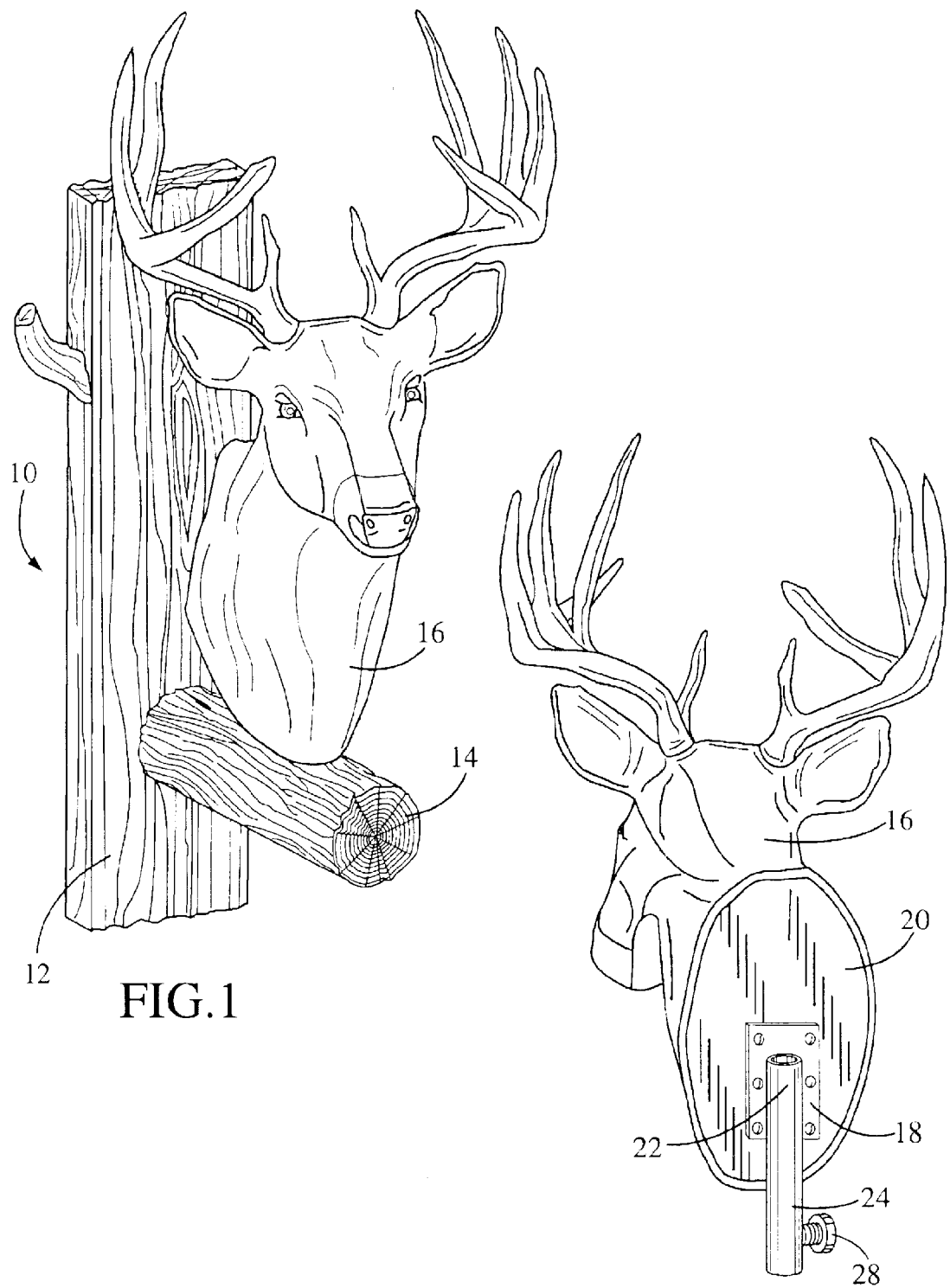
FIG. 1 is a front perspective view of the subject wall pedestal attached to a wall and illustrating a trophy deer head suspended thereon.
FIG. 2 is a rear perspective view of the trophy deer head shown in FIG. 1 and showing a display mounting plate attached to a rear portion of the deer head.

In FIG. 1, a front perspective view of the wall pedestal is shown and having general reference numeral 10. The wall pedestal 10 can include an imitation wall mounting plate cover 12 and an imitation support arm cover 14. The two covers 12 and 14 can be molded in plastic with an exterior surface looking like weather wood, rock and the like. This feature provides a pleasing outdoor appearance when used in conjunction with the wall pedestal. In this drawing, the wall pedestal 10 is shown displaying a trophy deer head 16 thereon. As mentioned above, the wall pedestal 10 is designed for holding various types of animal heads and other outdoor objects.

In FIG. 2, a rear perspective view of the deer head 16 is shown. A display mounting plate 18 is shown for attaching the wall pedestal 10 to a rear 20 of the deer head 16. A top portion 22 of a vertical sleeve 24 is attached to the display mounting plate 18. The vertical sleeve 24 is slidably received over a vertical pivot rod 26 and held thereon with a set screw 28. The pivot rod 26 is shown in FIG. 3.

Figures 3, 4:
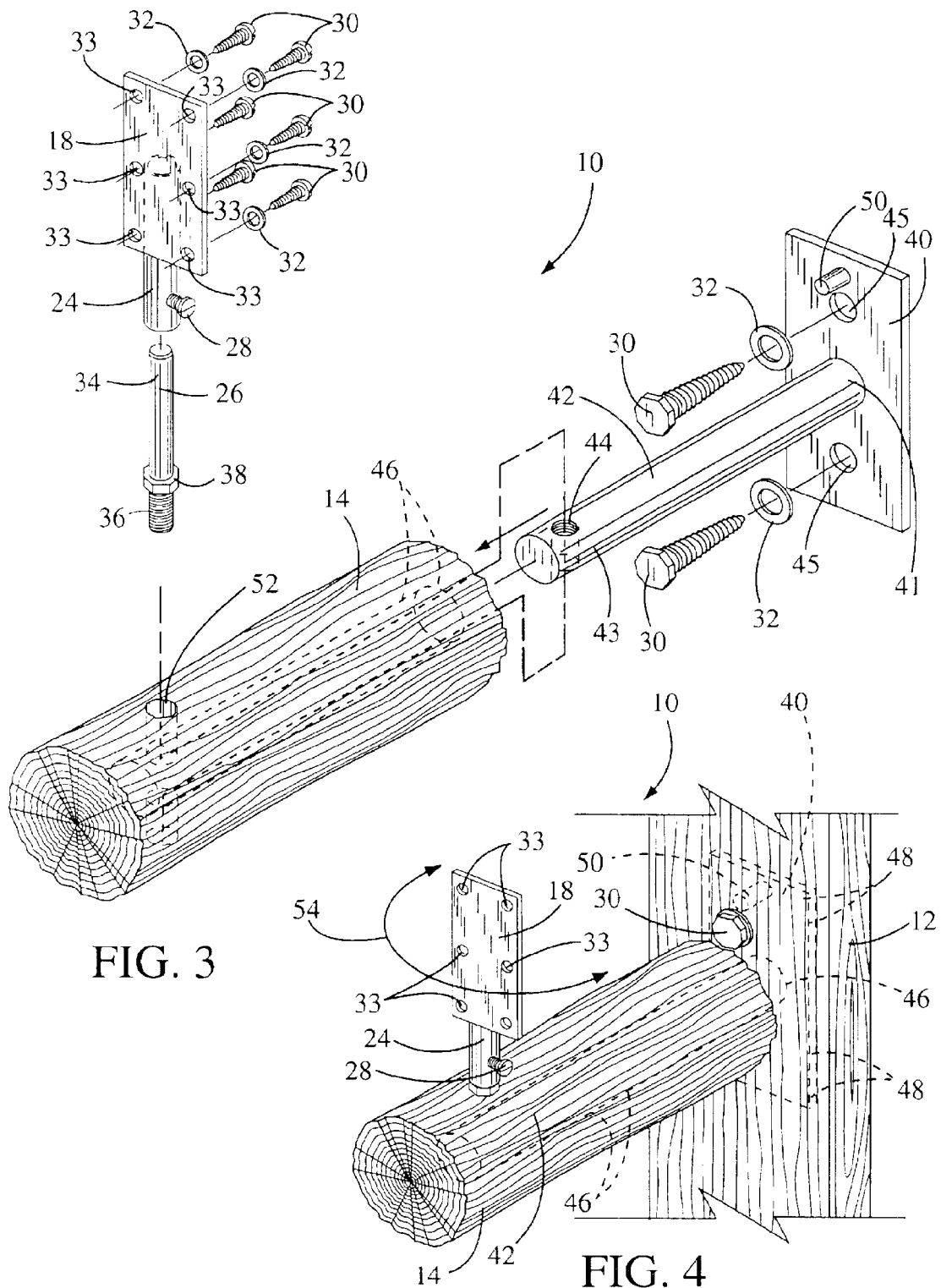
FIG. 3 is an exploded perspective view of the wall pedestal positioned for assembly.
FIG. 4 is a perspective view of the wall pedestal assembled and with the display mounting plate positioned for attachment to a wildlife object like the deer head shown in FIGS. 1 and 2.

In FIG. 3, an exploded perspective view of the wall pedestal 10 is shown and positioned for assembly and attaching to a wall and a wildlife object. The display mounting plate 18 is shown with a plurality of small screws 30 and washers 32 for attaching to the wildlife object. The screws 30 are received through screw holes 33 in the plate 18. The vertical sleeve 24 is shown positioned for slidable receipt around an upper portion 34 of the vertical pivot rod 26. A lower portion 36 of the pivot rod 26 is threaded and includes a stop 38.

The wall pedestal 10 also includes a wall mounting plate 40 having large screws 30 and washers 32 for securing the plate 40 to a wall. A horizontal support rod 42 includes a first end 41 attached to the front of the wall mounting plate 40. A second end 43 of the support rod 42 includes a threaded bore 44. The threaded bore 44 is used for receiving the threaded lower portion 36 of the pivot rod 26 therein. The stop 26 on the pivot rod 26 is used for helping secure the vertical pivot rod 26 on the vertical support rod 42 when the lower portion 36 is threaded into the bore 44.

When the wall pedestal 10 is installed, the wall mounting plate 40 is attached to the wall at a selected height using the washers 32 and the large screws 30 received through screw holes 45 in the plate 40. The wall mounting plate cover 12 with an elongated hole 46 therein is inserted around the horizontal support rod 42 and placed flush against the wall. The wall mounting plate 40 is received in a cavity 48 formed in the back of the cover 12. The hole 46 and cavity 48 are shown in dashed lines in FIG. 4. The wall mounting plate 40 also includes an outwardly extending stud 50. During the installation of the wall pedestal 10, the stud 50 is pushed into a portion of the back of the wall mounting plate cover 12 to prevent it from twisting or turning left or right when installed next to the wall.

After the wall mounting plate cover 40 is held in place on the wall as shown in FIG. 4, the horizontal support arm cover 14 is inserted around the support rod 42. The cover 14 includes a pivot rod hole 52 for receiving the threaded lower portion 36 of the vertical pivot rod 26 therethrough. The threaded lower portion 36 is then threaded into the bore 44 until the stop 38 engages the top of the sides of the bore.

In FIG. 4, a perspective front view of the wall pedestal 10 is shown assembled and disposed next to the wall with the horizontal support rod 42 and the support rod cover 12 extending outwardly from the wall. In this drawing, the vertical sleeve 24 is shown received around the vertical pivot rod 26. The display mounting plate 18 is now free to rotate, as indicated by arrow 54, on the pivot rod 26. The display mounting plate 18 is shown prior to being attached to an animal head or other wildlife object.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

What is claimed is:

1. A wall pedestal for displaying a wildlife object next to a wall and rotating the object in front of the wall, the wall pedestal comprising:

a wall mounting plate, said wall mounting plate adapted for securing to the wall, said wall mounting plate including a horizontal support arm extending outwardly therefrom;

a wall mounting plate cover for receipt over said wall mounting plate;

a vertical pivot rod, said vertical pivot rod attached to an end of said horizontal support arm;

a vertical sleeve, a portion of said vertical sleeve received around said vertical pivot rod and rotatable thereon; and a display mounting plate, said display mounting plate attached to said vertical sleeve, said display mounting plate adapted for attaching to a portion of the wildlife object.

2. The wall pedestal as described in claim 1 wherein said support arm includes a threaded bore therein for receiving a threaded lower end of said vertical pivot rod.

3. The wall pedestal as described in claim 1 wherein an upper end of said vertical pivot rod is slidably received in said vertical sleeve and a top portion of said vertical sleeve is attached to a portion of said display mounting plate.

4. The wall pedestal as described in claim 1 wherein said wall mounting plate cover is made of plastic and has an exterior surface with a weathered outdoor appearance.

5. The wall pedestal as described in claim 1 further including a support arm cover for receipt around said support arm.

6. The wall pedestal as described in claim 5 wherein said support arm cover is made of plastic and has an exterior surface with a weathered outdoor appearance.

7. A wall pedestal for displaying a wildlife object next to a wall and rotating the object in front of the wall, the wall pedestal comprising:

a wall mounting plate with screw fasteners, said screw fasteners adapted for securing said wall mounting plate to the wall, said wall mounting plate including an outwardly extending horizontal support arm;

a support arm cover for receipt around said support arm;

a vertical pivot rod, said vertical pivot rod threadably attached to an end of said horizontal support arm;

a vertical sleeve, a lower portion of said vertical sleeve received around said vertical pivot rod and rotatable thereon; and a display mounting plate, said display mounting plate attached to a portion of said vertical sleeve, said display mounting plate having screw fastener adapted for attaching said display mounting plate to a portion of the wildlife object.

8. The wall pedestal as described in claim 7 wherein said support arm includes a threaded bore therein for receiving a threaded lower end of said vertical pivot rod.

9. The wall pedestal as described in claim 7 wherein an upper end of said vertical pivot rod is slidably received in said vertical sleeve and a top portion of said vertical sleeve is attached to a portion of said display mounting plate.

10. The wall pedestal as described in claim 7 further including a wall mounting plate cover for receipt over a front of said wall mounting plate.

11. The wall pedestal as described in claim 10 wherein said wall mounting plate cover is made of molded plastic, said wall mounting plate cover having an exterior surface with a weathered outdoor appearance.

12. The wall pedestal as described in claim 7 wherein said support arm cover is made of molded plastic and has an exterior surface with a weathered outdoor appearance.

13. A wall pedestal for displaying a wildlife object next to a wall and rotating the object in front of the wall, the wall pedestal comprising:

a wall mounting plate with screw fasteners, said screw fasteners adapted for securing said wall mounting plate to the wall, said wall mounting plate including an outwardly extending horizontal support arm;

a vertical pivot rod, said vertical pivot rod threadably attached in a bore in an end of said horizontal support arm;

a vertical sleeve, a lower portion of said vertical sleeve received around said vertical pivot rod and rotatable thereon;

a display mounting plate, said display mounting plate attached to a portion of said vertical sleeve, said display mounting plate having screw fastener adapted for attaching said display mounting plate to a portion of the wildlife object; a wall mounting plate cover for covering a front of said wall mounting plate, a portion of said wall mounting plate cover adapted for covering a portion of the wall next to said wall mounting plate; and a support arm cover for receipt around said horizontal support arm.

14. The wall pedestal as described in claim 13 wherein said wall mounting plate cover is made of molded plastic, said wall mounting plate cover having an exterior surface with a weathered wood appearance.

15. The wall pedestal as described in claim 13 wherein said wall mounting plate cover is made of molded plastic, said wall mounting plate cover having an exterior surface with a rock appearance.

16. The wall pedestal as described in claim 13 wherein said support arm cover is made of molded plastic and has an exterior surface with a weathered wood appearance.

17. The wall pedestal as described in claim 13 wherein said support arm cover is made of molded plastic and has an exterior surface with a rock appearance.

* * * * *